(12) United States Patent
Sanpei (10) Patent No.: US 7,339,354 B2
(45) Date of Patent: Mar. 4, 2008

(54) RECHARGEABLE BATTERY CHARGING METHOD AND APPARATUS

(75) Inventor: Akira Sanpei, Fukushima (JP)

(73) Assignee: Sony Corporation (JP)

( * ) Notice: Subject to any disclaimer, the term of this patent is extended or adjusted under 35 U.S.C. 154(b) by 364 days.

(21) Appl. No.: 11/059,368

(22) Filed: Feb. 17, 2005

(65) Prior Publication Data

US 2005/0194938 A1    Sep. 8, 2005

(51) Int. Cl.
*H02J 7/04* (2006.01)
*H02J 7/16* (2006.01)
*H02J 7/00* (2006.01)

(52) U.S. Cl. ............... 320/141; 320/142; 320/143; 320/144; 320/145; 320/139; 320/140; 320/129

(58) Field of Classification Search ........ 320/141–146, 320/139, 140, 129; 323/265, 266, 273, 275
See application file for complete search history.

(56) References Cited

U.S. PATENT DOCUMENTS

| | | | | |
|---|---|---|---|---|
| 3,938,019 A | * | 2/1976 | Schmitt et al. | 320/139 |
| 5,442,274 A | * | 8/1995 | Tamai | 320/146 |
| 5,640,080 A | * | 6/1997 | Tamai et al. | 320/141 |

(Continued)

FOREIGN PATENT DOCUMENTS

EP    0 728 613    8/1996

(Continued)

OTHER PUBLICATIONS

European Patent Office, European Search Report for Application No. EP05290487, Jun. 29, 2005, pp. 1-3.*

(Continued)

*Primary Examiner*—Bao Q. Vu
*Assistant Examiner*—Jue Zhang
(74) *Attorney, Agent, or Firm*—Rader Fishman & Grauer PLLC; Ronald P. Kananen (57) ABSTRACT

A method and an apparatus for charging a lithium-ion based rechargeable battery in a short time is provided. A terminal voltage of the rechargeable battery is compared with a predetermined first set voltage V1 while charging the rechargeable battery with a constant current; pulse charging is performed in which charging is halted after the rechargeable battery is charged with the constant current only during a predetermined first set time T1 when the terminal voltage becomes the first set voltage V1 or more; both an elapsed time An from the start of the halt and a terminal voltage Bn at the elapsed time An are measured a plurality of times during the halt of charging in the pulse charging and the terminal voltage Bn is compared with a predetermined second set voltage V2; whether or not the terminal voltage drops to the second set voltage V2 or less is presumed based on measurement results of the elapsed time An and the terminal voltage Bn in the case where the terminal voltage Bn is higher than the second set voltage V2 when the elapsed time An reaches a predetermined second set time T2; both the pulse charging and the presumption of the terminal voltage are repeated when presumed that the terminal voltage drops to the second set voltage V2 or less; and charging is ended when presumed that the terminal voltage does not drop to the second set voltage V2 or less.

6 Claims, 5 Drawing Sheets

U.S. PATENT DOCUMENTS

| | | | |
|---|---|---|---|
| 5,654,622 A * | 8/1997 | Toya et al. | 320/129 |
| 6,144,188 A * | 11/2000 | Okada et al. | 320/141 |
| 6,154,011 A * | 11/2000 | Lam et al. | 320/139 |
| 6,307,353 B1 * | 10/2001 | Shiojima | 320/139 |
| 6,586,913 B2 * | 7/2003 | Rolfes | 320/162 |
| 2004/0133286 A1 * | 7/2004 | Futatsugi et al. | 700/28 |

FOREIGN PATENT DOCUMENTS

| | | |
|---|---|---|
| FR | 2 691 019 | 11/1993 |
| JP | 04-363679 | 12/1992 |
| JP | 06-325795 | 11/1994 |
| JP | 07-098367 | 4/1995 |
| JP | 2003-307556 | 10/2003 |

OTHER PUBLICATIONS

Japanese Office Action; Application: 2004-061103; Issued Date: Aug. 8, 2006.

EPO Search Report dated Jun. 29, 2005.

* cited by examiner

RECHARGEABLE BATTERY CHARGING METHOD AND APPARATUS

BACKGROUND OF THE INVENTION

1. Field of the Invention

The present invention relates to a charging method and a charging apparatus suitable for charging a lithium-ion-based rechargeable battery.

2. Description of the Related Art

In recent years, a lithium-ion battery which is higher in energy density and lighter in weight than a nickel-cadmium battery and a nickel-hydride battery has been widespread as a rechargeable battery used for a power supply to a notebook-size personal computer, a mobile phone unit and the like.

Nickel-cadmium batteries and nickel-hydride batteries have a characteristic that the terminal voltage drops slightly in the fully charged state. Accordingly, as a method for charging those batteries, there has been employed a method in which the temporal change in terminal voltage is measured while charging the batteries with a constant current and the charging is finished by judging that the batteries are in full charge, when the amount of change becomes negative (when $-\Delta V$ is detected).

On the other hand, a terminal voltage does not drop even in a fully-charged state in the case of a lithium-ion battery. Therefore, when the lithium-ion battery is charged by such a method applied to the nickel-cadmium battery and the nickel-hydride battery, it is not possible to judge the fully-charged state and insufficient charging or overcharge occurs, which makes the performance thereof deteriorate. Hence, a method such as the following method (a) or method (b) has been employed in the past as a method for charging the lithium-ion battery.

(a) In the beginning stage of charging, a terminal voltage is measured while performing the charging with a constant current. Thereafter, when the terminal voltage reaches a predetermined voltage, the charging is changed to the one with a constant voltage and measurement of a charging current is started. Then, when the charging current becomes equal to or less than a predetermined reference value, it is judged that the battery is fully charged, and the charging is ended.

(b) In the beginning stage of charging, a terminal voltage is measured while performing the charging with a constant current. Thereafter, when the terminal voltage reaches a predetermined voltage, the charging with the constant current is performed intermittently. In the intermittent charging, the following processing is repeated. Specifically, after charging during a fixed period of time, the charging is halted until the terminal voltage decreases so as to be stabilized at approximately a fixed value, and then it is detected whether or not this stabilized voltage is equal to or more than the reference value (a value equal to or close to a full-charged voltage). Then, when the voltage stabilized during the halt of the charging becomes equal to or more than the above-described reference value, it is judged that the battery is fully charged, and the charging is ended (for example, refer to Patent reference 1).

[Patent reference 1] Published Japanese Patent Application No. H6-325795 (paragraph numbers 0013 through 0023, and FIGS. 1 through 5)

However, in the above method of performing the constant current charging followed by the constant voltage charging as described in (a), there has been an inconvenience that it takes a long time until charging is completed.

In addition, there also has been an inconvenience that it takes a long time until charging is completed in the method (b) described above, because the halt time becomes long at the time of performing the intermittent charging (charging is continuously halted until the terminal voltage is stabilized).

SUMMARY OF THE INVENTION

The present invention is made in view of the above-described problems and aims to charge in a short time a lithium-ion-based rechargeable battery, such as a lithium-ion battery, a lithium battery and a lead battery, which is a rechargeable battery whose terminal voltage does not drop even in a fully-charged state.

A rechargeable-battery charging method according to an embodiment of the present invention includes the steps of: performing pulse charging in which a terminal voltage of a rechargeable battery is compared with a predetermined first set voltage while charging the rechargeable battery with a constant current and charging is halted after charging the rechargeable battery only during a predetermined first set time when the terminal voltage becomes the first set voltage or more; measuring a plurality of times both an elapsed time An from the start of the halt and a terminal voltage Bn at the elapsed time An during the halt of the pulse charging; comparing the terminal voltage Bn with a predetermined second set voltage and presuming based on measurement results of the elapsed time An and the terminal voltage Bn whether or not the terminal voltage drops to the second set voltage or less in the case where the terminal voltage Bn is higher than the second set voltage when the elapsed time An reaches a predetermined second set time; and repeating both the pulse charging and the assumption of the terminal voltage in the case where it is presumed that the terminal voltage drops to the second set voltage or less and ending the charging in the case where it is presumed that the terminal voltage does not drop to the second set voltage or less.

According to the above charging method, the pulse charging is performed after the rechargeable battery is charged with the constant current up to the first set voltage, and both the elapsed time An from the start of the halt and the terminal voltage Bn at the elapsed time An are measured a plurality of times during the halt of charging in the pulse charging; and the terminal voltage Bn is compared with the second set voltage, and whether or not the terminal voltage drops to the second set voltage or less is presumed based on the measurement results of the elapsed time An and the terminal voltage Bn in the case where the terminal voltage Bn is higher than the second set voltage when the elapsed time An reaches the predetermined second set time.

In the case where it is presumed that the terminal voltage drops to the second set voltage or less, both the pulse charging and the assumption of the terminal voltage are repeated. Further, when it is presumed that the terminal voltage will not drop to the second set voltage or less, it is judged that the battery is fully charged to end the charging.

Thus, according to the above charging method, the pulse charging is performed after charging is performed with the constant current until the terminal voltage becomes a fixed voltage (first set voltage), and in the case where the terminal voltage does not drop to a fixed voltage (second set voltage) or less after the elapsed time from the start of the halt of charging reaches a fixed time (second set time) in the pulse charging, whether or not the terminal voltage drops to the second set voltage or less is presumed based on a plurality of measurement results of both the elapsed time and the terminal voltage during the halt without continuing the halt until it becomes definite whether or not the terminal voltage actually drops to the second set voltage or less; and it is decided whether the pulse charging is repeated or the charging is ended.

Accordingly, a lithium-ion based rechargeable battery can be charged in a short time, as compared with the method of performing the constant-current charging followed by the constant-voltage charging as described in the above charging method (a) and with the method of performing the constant current charging followed by the intermittent charging with the constant current, in which the halt time when performing the intermittent charging becomes long (in which the halt continues until the terminal voltage is stabilized), as described in the above charging method (b).

Further, as an embodiment of this charging method, it is preferable that the terminal voltage Bn when the elapsed time An from the start of the halt becomes a predetermined third set time T3 which is longer than the second set time is calculated during the halt of charging in the pulse charging by the following calculation method based on a data group (An, Bn) including the elapsed time An and the terminal voltage Bn; in the case where the calculated value of the terminal voltage Bn is the second set voltage or less, both the pulse charging and the calculation of the terminal voltage Bn are repeated; and in the case where the calculated value of the terminal voltage Bn is higher than the second set voltage, charging is ended. Moreover, it is preferable that the third set time T3 is set to infinite time.

[Formula 1]
[Calculation Method of Terminal Voltage Bn at Third Set Time T3]

Data group (Cn, Bn) is made from the data group (An, Bn), where $Cn=1/\sqrt{An}$ D and E are obtained from the data group (Cn, Bn) by the least-square method, where $$D = \frac{\sum_{i=1}^{n}\left[Ci - \frac{1}{n}\left(\sum_{i=1}^{n}Ci\right)\right]\left[Bi - \frac{1}{n}\left(\sum_{i=1}^{n}Bi\right)\right]}{\sum_{n=1}^{n}\left[Ci - \frac{1}{n}\left(\sum_{i=1}^{n}Ci\right)\right]^2}$$

$$E = \frac{1}{n}\left(\sum_{i=1}^{n}Bi\right) - D*\left[\frac{1}{n}\left(\sum_{i=1}^{n}Ci\right)\right]$$

Bn is assumed to be the following linear expression of Cn:

$Bn=D*Cn\times E$, and

Bn is calculated when $An=T3(Cn=1/\sqrt{T3})$.

Thus, the terminal voltage Bn at the time when the elapsed time An from the start of the halt becomes the third set time which is longer than the second set time can be obtained by using the least-square method and by assuming that Bn is the linear expression of Cn, and, further, whether or not the terminal voltage drops to the second set voltage or less can be presumed with high accuracy by the simple calculation, because the third set time is set to infinite time. Accordingly, charging can be performed in a short time without incurring a deterioration in performance due to insufficient charging or overcharge.

Further, in the case where the terminal voltage Bn is calculated, as an embodiment, it is preferable that both the pulse charging and the calculation of the terminal voltage Bn are repeated until the calculated value of the terminal voltage Bn becomes consecutively higher than the second set voltage during the pulse charging of N pulses (N is an integer of 2 or more) and the charging is ended when the calculated value of the terminal voltage Bn is consecutively higher than the second set voltage during the pulse charging of N pulses.

Thus, the fully-charged state can be judged with higher accuracy, because the charging is ended not after the value of the terminal voltage Bn becomes higher than the second set voltage only once, but after the calculated value of the terminal voltage Bn becomes higher than the second set voltage N times consecutively. Accordingly, the performance of the rechargeable battery can be improved further.

In addition, when a battery pack including a plurality of rechargeable batteries connected is charged in this charging method, it is preferable as an embodiment that each of the terminal voltages of the plurality of rechargeable batteries is measured and the highest terminal voltage among them is compared with the first set voltage and the second set voltage.

Next, a rechargeable-battery charging apparatus according to an embodiment of the present invention includes a charger for charging a rechargeable battery, a voltage detector for detecting a terminal voltage of the rechargeable battery and a controller for controlling charging of the rechargeable battery, wherein the controller performs processing of comparing the terminal voltage of the rechargeable battery with a predetermined first set voltage using a detection result of the voltage detector while charging the rechargeable battery with a constant current using the charger, processing of pulse charging in which charging is halted after the rechargeable battery is charged only during a predetermined first set time using the charger when the terminal voltage becomes the first set voltage or more, processing of measuring a plurality of times both an elapsed time An from the start of the halt and a terminal voltage Bn at the elapsed time An using the detection result of the voltage detector during the halt of charging in the pulse charging, comparing the terminal voltage Bn with a predetermined second set voltage, and presuming whether or not the terminal voltage drops to the above-described second set voltage or less based on measurement results of both the elapsed time An and the terminal voltage Bn in the case where the terminal voltage Bn is higher than the second set voltage when the elapsed time An reaches a predetermined second set time, and processing of repeating both the pulse charging and the presumption of the terminal voltage in the case where it is presumed that the terminal voltage drops to the second set voltage or less and ending the charging in the case where it is presumed that the terminal voltage does not drop to the second set voltage or less.

In the above charging apparatus, the controller carries out the above-described charging method according to an embodiment of the present invention using the charger and the voltage detector, and a lithium-ion-based rechargeable battery can be charged in a short time.

According to the embodiment of the present invention, since pulse charging is performed after charging is performed with the constant current until the terminal voltage becomes a fixed voltage (first set voltage) and whether or not the terminal voltage actually drops to the second set voltage or less is presumed based on a plurality of measurement results of both the elapsed time and the terminal voltage during the halt of charging in this pulse charging, an effectiveness such that a lithium-ion-based rechargeable battery can be charged in a short time is obtained.

Further, the terminal voltage Bn at the time when the elapsed time An from the start of the halt becomes the third set time which is longer than the second set time can be obtained by using the least-square method and by assuming that Bn is the linear expression of Cn, and, furthermore, whether or not the terminal voltage drops to the second set voltage or less can be presumed with high accuracy by a simple calculation, when the third set time is set to infinite time. Accordingly, an effectiveness such that charging can be performed in a short time without incurring the deterioration in performance due to insufficient charging or overcharge can be obtained.

Moreover, since charging is ended not after the value of the terminal voltage Bn becomes higher than the second set voltage only once but after the calculated value of the terminal voltage Bn becomes higher than the second set voltage N times consecutively, the fully-charged state can be judged with higher accuracy, so that an effectiveness such that the performance of the rechargeable battery can be improved further is obtained.

DESCRIPTION OF THE PREFERRED EMBODIMENTS

Hereinafter, the present invention is specifically explained using the accompanying drawings.

Figure 1:
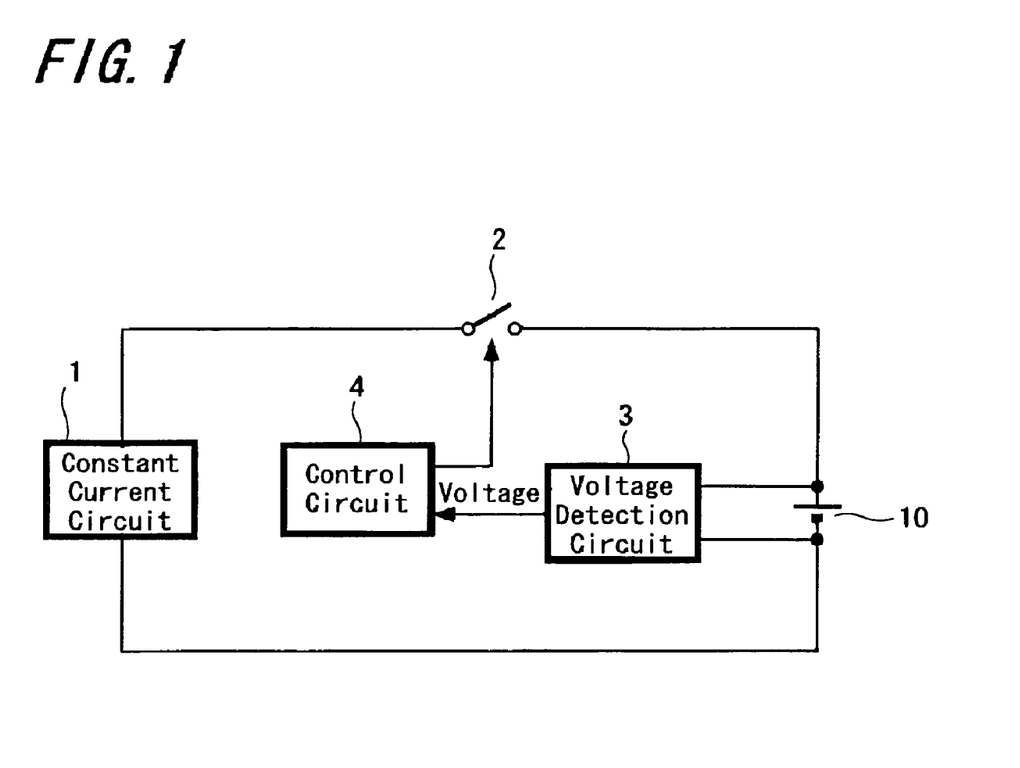
FIG. 1 is a block diagram showing a configuration of a charging apparatus to which the present invention is applied.

FIG. 1 is a block diagram showing a configuration of a charging apparatus to which this invention is applied. This charging apparatus is provided to charge a lithium-ion battery 10 of a full-charged voltage 4.2 (V) and a capacity 2,000 (mAh) and includes a constant current circuit 1, a switch 2, a voltage detection circuit 3 and a control circuit 4.

The constant-current circuit 1 is a circuit to generate a constant current of 1.6 A based on electric power supplied from the outside (for example, commercial power).

The lithium-ion battery 10 to be charged is connected to the constant-current circuit 1 through the switch 2. The switch 2 is controlled to be ON and OFF by the control circuit 4.

The voltage detection circuit 3 is a circuit to detect a terminal voltage of the lithium-ion battery 10. A detected output of the voltage detection circuit 3 is sent to the control circuit 4. The control circuit 4 includes a microprocessor.

Figure 2:
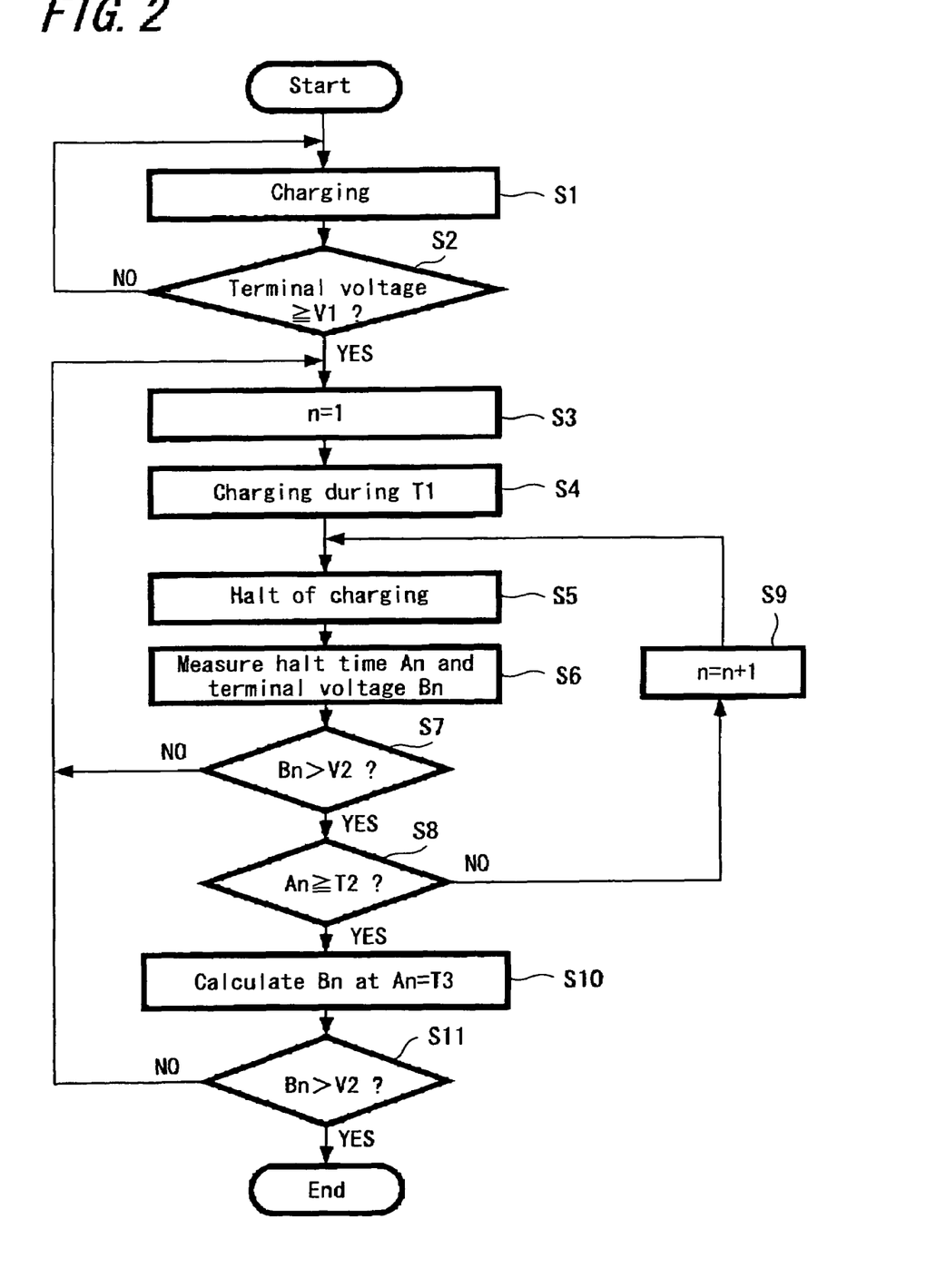
FIG. 2 is a flow chart showing processing performed by a control circuit shown in FIG. 1.

FIG. 2 is a flow chart showing processing performed by the control circuit 4. In this processing, the switch 2 is first turned on, and then the lithium-ion battery 10 mounted on this charging apparatus is charged with the constant current by the constant-current circuit 1 (Step S1).

Subsequently, during the charging, the terminal voltage of the lithium-ion battery 10 is measured from the detection output of the voltage detection circuit 3, and it is judged whether or not the terminal voltage has reached a first set voltage V1=4.25 (V) (a slightly higher voltage than a voltage at the time when the lithium-ion battery 10 is full-charged) (Step S2).

If the judgment is NO, the process returns to Step S1. On the other hand, when the judgment becomes YES, n=1 is set (Step S3). Further, the charging is performed with the constant current by turning on the switch 2 only for a first set time T1=1.0 (sec) (Step S4), and after that the charging is halted by turning off the switch 2 (Step S5). That is, pulse charging by one pulse is performed.

Subsequently, when it is measured by a timer in the microprocessor that the elapsed time from the start of the halt becomes An=0.25×n (sec), the terminal voltage Bn of the lithium-ion battery 10 at the elapsed time An is measured from the detection result of the voltage detection circuit 3 (Step S6).

Then, it is judged whether or not the measured terminal voltage Bn is higher than the second set voltage V2=4.2 (V) (the voltage when the lithium-ion battery 10 is full-charged) (Step S7). If the judgment is NO, the process returns to Step S3. On the other hand, if the judgment is YES, it is judged whether or not the measured elapsed time An is equal to or more than the second set time T2=4.0 (sec) (Step S8).

If the judgment is NO at Step 8, the value of n is incremented by 1 (Step S9) and the process returns to Step S5. Further, when the judgment becomes YES at Step S8, the value of the terminal voltage Bn of the lithium-ion battery 10 at the time when the elapsed time An from the start of the halt becomes a predetermined third set time T3 (hereupon, T3=∞) which is longer than the second set time T2 is calculated by the following calculation method based on the data group (An, Bn) including the elapsed time An and the terminal voltage Bn that have heretofore been measured (Step S10).

[Formula 2]

[Calculation Method of Terminal Voltage Bn at Third Set Time T3]

Data group (Cn, Bn) is made from the data group (An, Bn), where $$Cn = 1/\sqrt{An} \qquad (1)$$

D and E are obtained from the data group (Cn, Bn) by the least-square method, where $$D = \frac{\sum_{i=1}^{n}\left[Ci - \frac{1}{n}\left(\sum_{i=1}^{n} Ci\right)\right]\left[Bi - \frac{1}{n}\left(\sum_{i=1}^{n} Bi\right)\right]}{\sum_{n=1}^{n}\left[Ci - \frac{1}{n}\left(\sum_{i=1}^{n} Ci\right)\right]^2} \qquad (2)$$

$$E = \frac{1}{n}\left(\sum_{i=1}^{n} Bi\right) - D * \left[\frac{1}{n}\left(\sum_{i=1}^{n} Ci\right)\right] \qquad (3)$$

Bn is assumed to be the following linear expression of Cn:

$$Bn = D * Cn \times E \qquad (4)$$

and Bn is calculated when An=T3(Cn=1/√T3).

Subsequently, it is judged whether or not this calculated value of the terminal voltage Bn is larger than the second set voltage V2=4.2 (V) (Step S11). Thus, whether or not the terminal voltage of the lithium-ion battery 10 drops to the second set voltage V2=4.2 (V) or less by this halt of charging is presumed based on the a plurality of measurement results of both the elapsed time An and the terminal voltage Bn during the halt of the charging.

If the judgment is NO at Step S11, the process returns to Step S3. On the other hand, when the judgment becomes YES at Step S11, it is judged that the battery is fully charged, and charging is ended.

Next, an explanation is given with respect to a state where the lithium-ion battery 10 mounted on the charging apparatus is charged. In this charging apparatus, charging is first performed with the constant current by the constant current circuit 1 until the terminal voltage of the lithium-ion battery 10 reaches the first set voltage V1=4.25 (V) (Steps S1 and S2 in FIG. 2).

When the terminal voltage reaches the first set voltage V1=4.25 (V), after performing the charging with the constant current only for the first set time T1=1.0 (sec), the charging is halted. In other words, the pulse charging of the first pulse is performed. Further, terminal voltages B1, B2, - - - respectively corresponding to elapsed time A1=0.25 (sec), A2=0.5 (sec), - - - from the start of the halt are measured (Steps S3 through S9 in FIG. 2).

Figure 3:
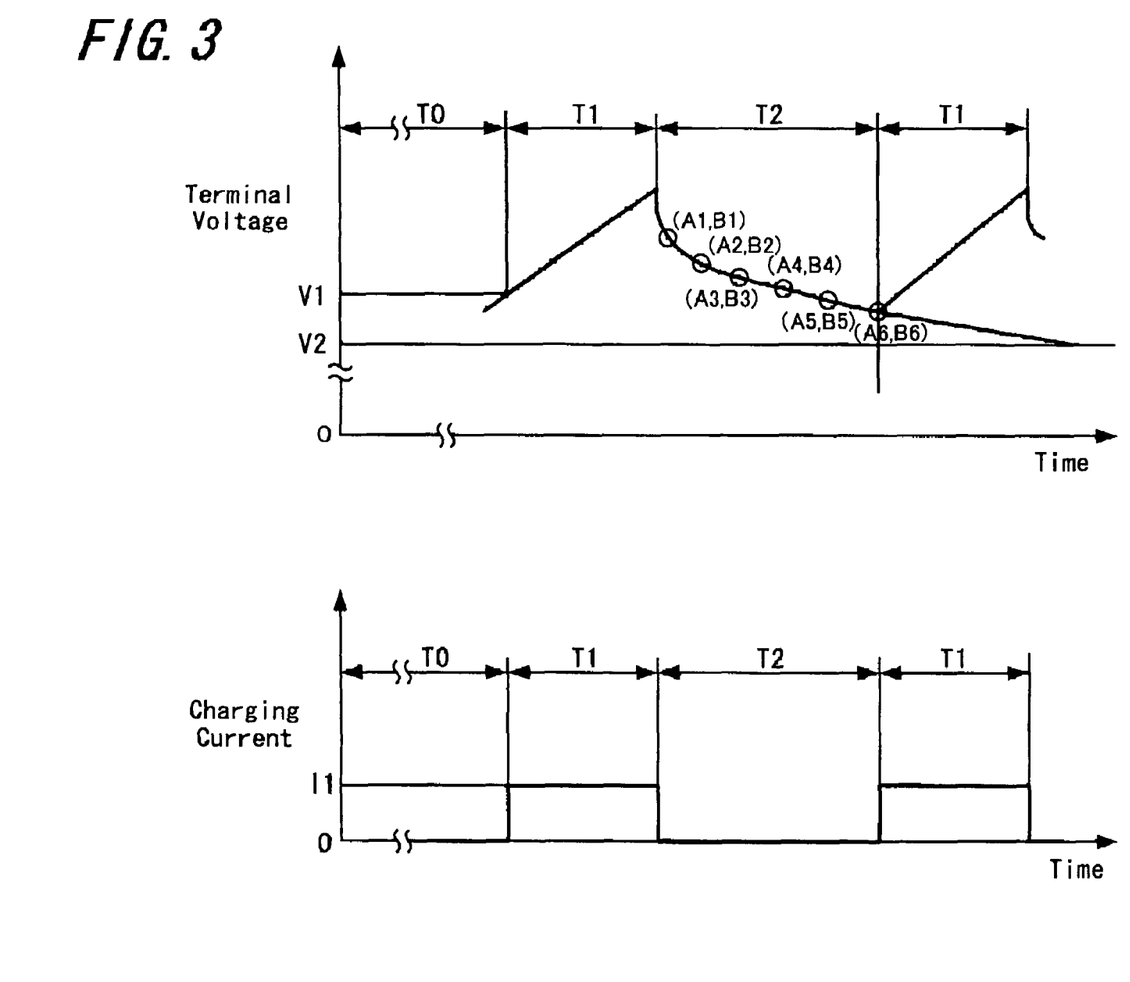
FIG. 3 is a diagram showing a temporal change of a terminal voltage and a charging current at the time of charging in the charging apparatus shown in FIG. 1.

FIG. 3 is a diagram showing a temporal change of the terminal voltage and the charging current on the pulse charging, in which the elapsed time until the start of the pulse charging is made T0.

In the case where the terminal voltage Bn is still higher than the second set voltage V2=4.2 (V) after the elapsed time from the start of the halt reaches the second set time T2=4.0 (sec), the terminal voltage Bn at the time when the elapsed time An from the start of the halt becomes the third set time T3= can be obtained from the above-described calculation formulas (1) through (4) by using the least-square method and by assuming that Bn is the linear expression of Cn. Then, whether or not the terminal voltage drops to the second set voltage V2=4.2 (V) or less due to the halt of charging this time is presumed from the calculated value of this terminal voltage Bn (Steps S10 and S11 in FIG. 2).

Figure 4:
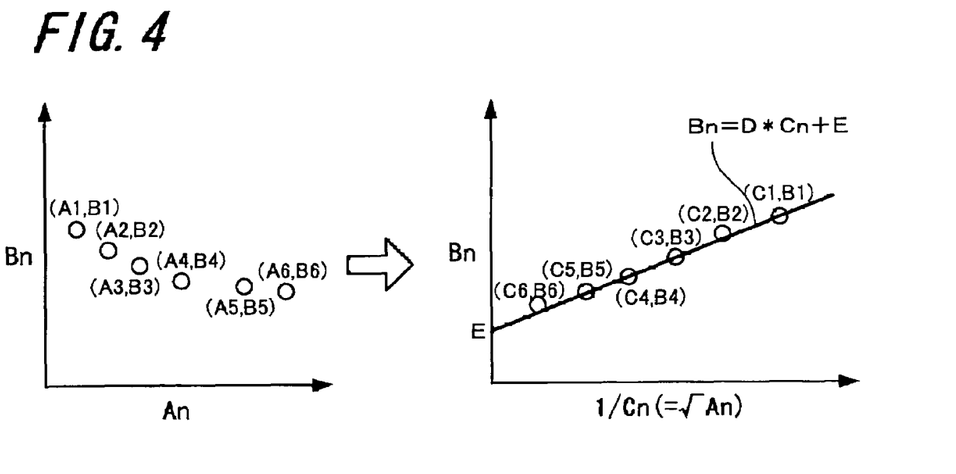
FIG. 4 is a diagram showing relations between a measured value of a terminal voltage Bn and values of Cn, D and E.

FIG. 4 shows relations between values of Cn, D and E that are obtained by the calculation formulas (1) through (3) based on examples of the measurement result of both the elapsed time An and the terminal voltage Bn shown in FIG. 3 and the measured values of the terminal voltage Bn. This diagram also shows that the terminal voltage Bn is assumed to be the linear expression of Cn as described in the calculation formula (4).

When it is presumed that the terminal voltage drops to the second set voltage V2=4.2 (V) or less, the pulse charging of the second pulse is performed and the presumption of the terminal voltage is repeated (from Step S11 to Step S3 in FIG. 2).

Figure 5:
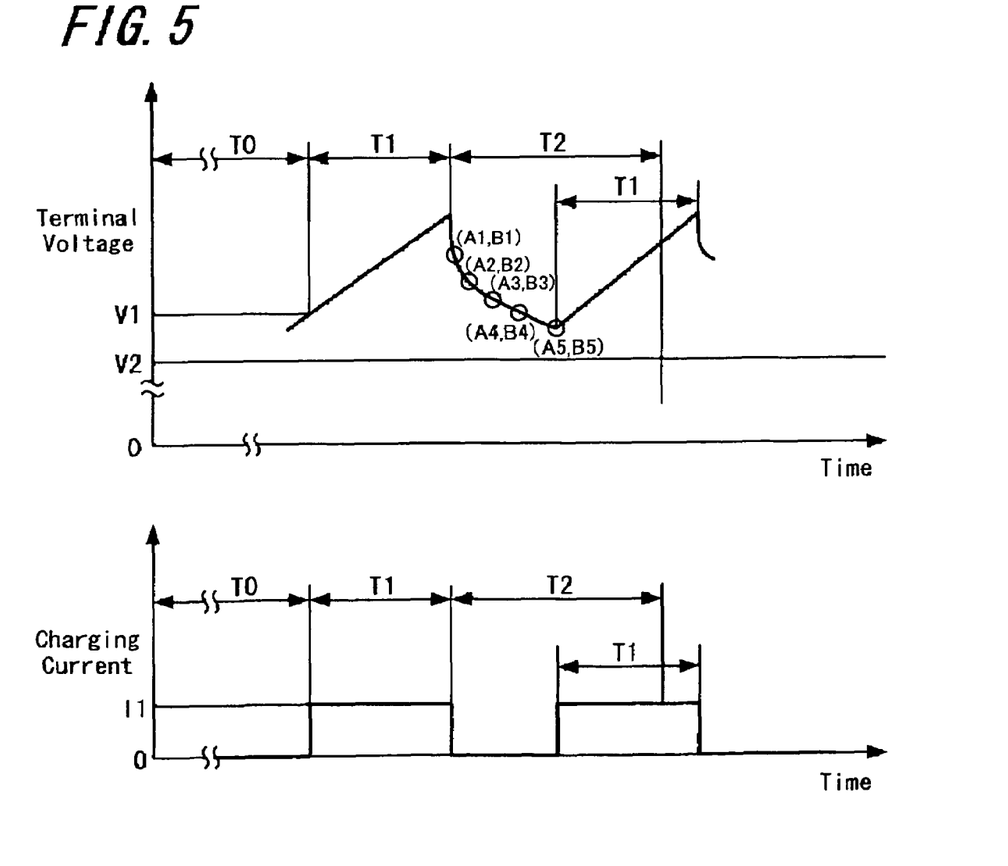
FIG. 5 is a diagram showing a temporal change of the terminal voltage and the charging current, in the case where the terminal voltage Bn drops to a first set voltage V2 or less before an elapsed time from the start of a halt of charging reaches a second set time T2.

Further, in the case where the terminal voltage Bn drops to the first set voltage V2=4.2 (V) or less before the elapsed time from the start of the halt reaches the second set time T2=4.0 (sec), the pulse charging of the second pulse is performed before reaching the second set time T2 as shown in FIG. 5 (from Step S7 to Step S3 in FIG. 2).

Since the rate of drop in terminal voltage becomes gradually smaller (the value of the terminal voltage Bn becomes higher) by thus repeating the pulse charging, it is ultimately presumed that the terminal voltage will not drop to the second set voltage V2=4.2 (V) or less and charging is ended.

Thus, according to this charging apparatus, pulse charging is performed with the constant current after charging is performed with the constant current until the terminal voltage of the lithium-ion battery 10 becomes a fixed voltage (first set voltage V1), and in the case where the terminal voltage does not drop to a fixed voltage (second set voltage V2) or less in the pulse charging after the elapsed time from the start of the halt of charging reaches a fixed time (second set time T2), whether or not the terminal voltage will drop to the second set voltage V2 or less is presumed based on a plurality of measurement results of both the elapsed time An and the terminal voltage Bn during the halt without continuing the halt until it becomes definite whether or not the terminal voltage actually drops to the second set voltage V2 or less; and it is decided whether the pulse charging is repeated or charging is ended.

Accordingly, the lithium-ion battery 10 can be charged in a short time in comparison with such methods in related art as the method of performing constant-current charging followed by constant-voltage charging and the method of performing constant-current charging followed by intermittent charging with constant current in which the halt time at the time of the intermittent charging becomes long (the halt continues until the terminal voltage is stabilized).

Further, as shown in the above-described formulas (2) through (4), since the terminal voltage Bn at the time when the elapsed time An from the start of the halt becomes the third set time T3 can be obtained by using the least-square method and by assuming that Bn is the linear expression of Cn and further the third set time T3 is set to infinite time, whether or not the terminal voltage will drop to the second set voltage T2 or less can be presumed with high accuracy by a simple calculation. Accordingly, charging can be performed in a short time without incurring the deterioration in performance due to insufficient charging or overcharge.

It should be noted that charging is ended in the above embodiment when the calculated value of the terminal voltage Bn becomes higher only once than the second set voltage V2 as shown in FIG. 2. However, it also is possible as another embodiment that charging is ended after the calculated value of the terminal voltage Bn becomes consecutively higher N times (N is an integer of 2 or more) than the second set voltage V2.

Figure 6:
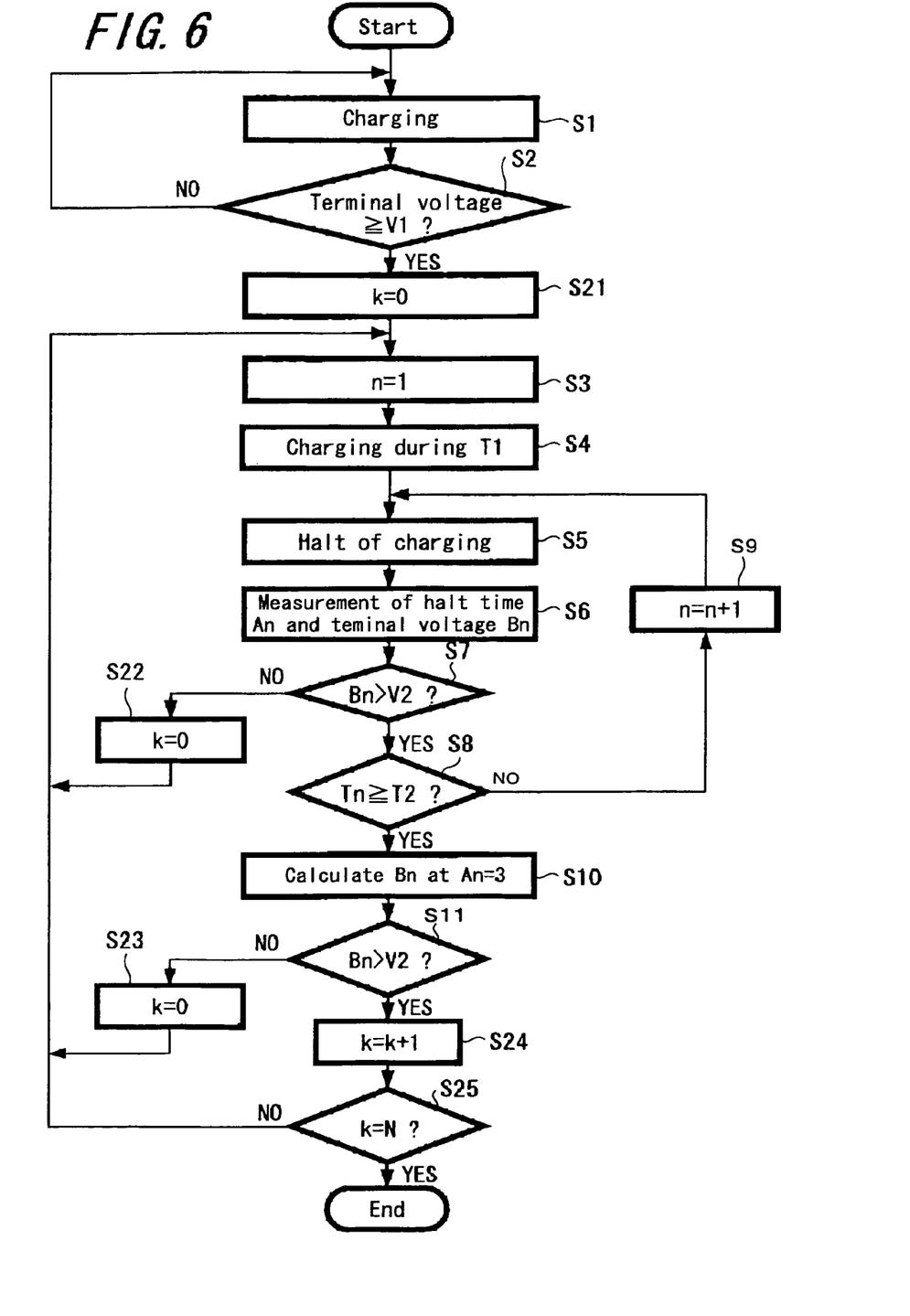
FIG. 6 is a flow chart showing another example of the processing performed by the control circuit shown in FIG. 1.

FIG. 6 is a flow chart showing processing performed by the control circuit 4 in such an example, and the same step numbers are given to processing corresponding to those in FIG. 2. In this processing, k=0 is set between Step S2 and Step S3 (Step S21). Further, k=0 also is set in case that the judgment is NO at Step S7 and in case that the judgment is NO at Step S11 (Steps S22 and S23).

Further, when the judgment becomes YES at Step S11, the value of k is incremented by 1 (Step S24), and it is judged whether or not k becomes k=N (Step S25). If the judgment is NO, the process returns to Step S3. On the other hand, if the judgment is YES, it is judged that the battery is fully charged, and charging is ended.

As described above, charging is ended not after the value of the terminal voltage Bn becomes higher than the second set voltage only once, but after the calculated value of the terminal voltage Bn becomes higher than the second set voltage N times consecutively, so that the fully-charged state can be judged with higher accuracy. Accordingly, the performance of the rechargeable battery can be improved further.

In addition, although one lithium-ion battery 10 is charged in the above-described example, a battery pack in which a plurality of lithium-ion batteries 10 are connected may be charged. Further, it is preferable in this case that each terminal voltage of the plurality of lithium-ion batteries 10 is measured and the highest terminal voltage among them is compared with the first set voltage V1 and the second set voltage V2.

Further, the values of the first set voltage V1, the second set voltage V2, the first set time T1, the second set time T2 and the elapsed time An in the above-described embodiments are only examples, and the values may be altered accordingly depending on the full-charged voltage and the like of a lithium-ion battery to be charged. In addition, the third set time T3 also may be set to an appropriate finite time instead of infinite time, which is longer than the second set time T2.

Moreover, pulse charging is performed with a constant current in the above-described embodiments. However, the pulse charging is not limited thereto, and in order to protect the lithium-ion battery from over-voltage, a maximum allowable voltage applied to a lithium-ion battery is set to a constant voltage value and a charging current is controlled (constant-voltage and constant-current charging is performed) such that the applied voltage does not exceed the constant-voltage value when performing the pulse charging.

Furthermore, the present invention is applied in the above-described embodiments to a lithium-ion battery to be charged, however, the present invention also can be applied to other lithium-ion-based rechargeable batteries (a lithium battery or a lead battery) than this to be charged.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A rechargeable-battery charging method comprising the steps of:
    performing pulse charging in which a terminal voltage of a rechargeable battery is compared with a predetermined first set voltage while charging said rechargeable-battery with a constant current and charging is halted after a predetermined first set time elapses when said terminal voltage becomes said predetermined first set voltage or more;
    measuring an elapsed time An from when the charging is halted and measuring said terminal voltage Bn while the charging is halted;
    charging said rechargeable-battery for the predetermined first set time where it is determined that said terminal voltage Bn drops to said predetermined second set voltage or less within predetermined second set time;
    repeating said measuring and charging steps until said terminal voltage Bn does not drop to said predetermined second set voltage or less within said predetermined second set time and determining a number of times n that said rechargeable-battery is charged for the predetermined first set time during a charging cycle;
    determining a calculated value of said terminal voltage Bn corresponding to a predetermined third set time that is longer than said predetermined second set time, wherein the calculated value accounts for the number of times n that said rechargeable-battery is charged; and
    repeating said charging where the calculated value of said terminal voltage Bn is said predetermined second set voltage or less and ending said charging where the calculated value of said terminal voltage Bn does not drop to said second set voltage or less.

2. The rechargeable-battery charging method according to claim 1, wherein during the halt of charging in said pulse charging, said terminal voltage Bn at the time when said elapsed time An from the start of the halt becomes the predetermined third set time a calculation based on a data group (An, Bn) including said elapsed time An and said terminal voltage Bn, and in the case where a calculated value of said terminal voltage Bn is said second set voltage or less, both said pulse charging and the calculation of said terminal voltage Bn are repeated, and in the case where a calculated value of said terminal voltage Bn is higher than said second set voltage, charging is ended, and wherein the calculation based on the data group (An, Bn) comprises:
    Data group (Cn, Bn) is made from the data group (An, Bn), where $Cn = 1/\sqrt{An}$, where D and E are obtained from the data group (Cn, Bn) by the least-square method, where $$D = \frac{\sum_{i=1}^{n}\left[Ci - \frac{1}{n}\left(\sum_{i=1}^{n} Ci\right)\right]\left[Bi - \frac{1}{n}\left(\sum_{i=1}^{n} Bi\right)\right]}{\sum_{n=1}^{n}\left[Ci - \frac{1}{n}\left(\sum_{i=1}^{n} Ci\right)\right]^2}$$

$$E = \frac{1}{n}\left(\sum_{i=1}^{n} Bi\right) - D * \left[\frac{1}{n}\left(\sum_{i=1}^{n} Ci\right)\right],$$

where
    Bn is assumed to be the following linear expression of Cn:

$Bn = D * Cn \times E$, and where

Bn is calculated when $An = T3 (Cn = 1/\sqrt{T3})$.

3. The rechargeable-battery charging method according to claim 2, wherein
    the predetermined third set time is infinite time.

4. The rechargeable-battery charging method according to claim 2 or 3, wherein
    both said pulse charging and determining the calculated value of said terminal voltage Bn are repeated until the calculated value of said terminal voltage Bn becomes continuously higher than said predetermined or N consecutive instances of said pulse charging and determining the calculated value, wherein N is an integer of 2 or more.

5. The rechargeable-battery charging method according to claim 1, wherein
    each terminal voltage of a plurality of rechargeable batteries is measured when charging a battery pack in which said plurality of rechargeable batteries are connected, and the highest terminal voltage thereof is compared with said first set voltage and said second set voltage.

6. A rechargeable-battery charging apparatus comprising:

a charger for charging a rechargeable battery;

a voltage detector for detecting a terminal voltage of said rechargeable battery; and a controller for controlling charging of said rechargeable battery, wherein said controller performs processing of comparing the terminal voltage of said rechargeable battery with a predetermined first set voltage using a detection result of said voltage detector while said rechargeable battery is charged with a constant current by said charger, processing of pulse charging said rechargeable-battery wherein charging is halted after a predetermined first set time elapses when said terminal voltage becomes said predetermined first set voltage or more, processing of measuring an elapsed time An from when the charging is halted and measuring said terminal voltage Bn while the charging is halted, charging said rechargeable-battery for the predetermined first set time where it is determined that said terminal voltage Bn drops to said predetermined second set voltage or less within predetermined second set time, repeating said measuring and charging steps until said terminal voltage Bn does not drop to said predetermined second set voltage or less within said predetermined second set time and determining a number of times n that said rechargeable-battery is charged for the predetermined first set time during a charging cycle, determining a calculated value of said terminal voltage Bn corresponding to a predetermined third set time that is longer than said predetermined second set time, wherein the calculated value accounts for the number of times n that said rechargeable-battery is charged, and processing of repeating said charging where the calculated value of said terminal voltage Bn is said predetermined second set voltage or less and ending said charging where the calculated value of said terminal voltage Bn does not drop to said second set voltage or less.

* * * * *